(12) United States Patent
Waters et al.

(10) Patent No.: US 6,763,718 B1
(45) Date of Patent: Jul. 20, 2004

(54) MICRO-ELECTRO-MECHANICAL SYSTEMS ULTRA-SENSITIVE ACCELEROMETER WITH INDEPENDENT SENSITIVITY ADJUSTMENT

(75) Inventors: Richard L. Waters, San Diego, CA (US); Monti E. Aklufi, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/245,617

(22) Filed: Sep. 17, 2002

Related U.S. Application Data

(63) Continuation-in-part of application No. 09/892,301, filed on Jun. 26, 2001, now Pat. No. 6,546,798.

(51) Int. Cl.$^7$ .......................... G01P 15/08; G01B 11/00
(52) U.S. Cl. ..................... 73/514.26; 356/506
(58) Field of Search ................... 73/514.26, 514.29, 73/514.27, 514.16, 514.01, 657; 356/337, 450, 454, 506; 250/227.14, 227.18

(56) References Cited

U.S. PATENT DOCUMENTS 6,550,330 B1 * 4/2003 Waters et al. ............ 73/514.25
6,581,465 B1 * 6/2003 Waters et al. ............ 73/514.26

* cited by examiner

*Primary Examiner*—Helen Kwok
(74) *Attorney, Agent, or Firm*—Peter A. Lipovsky; Michael A. Kagan; Celia C. Dunham

(57) ABSTRACT

An accelerometer is based upon the monolithic integration of a Fabry-Perot interferometer and a $p^+n$ silicon photosensor. Transmission of light through a Fabry-Perot interferometer cavity is exponentially sensitive to small displacements in a movable mirror due to an applied accelerating force. The photosensor converts this displacement into an electrical signal as well as provides for additional amplification. Because the interferometer and photosensor are monolithically integrated on a silicon substrate, the combination is compact and has minimal parasitic elements, thereby reducing the accelerometer's noise level and increasing its signal-to-noise ratio (SNR).

The accelerometer's sensitivity can be user-controlled by any one or a combination of factors: adjusting the length between the mirrors of the Fabry-Perot cavity; adjusting the power of the light projected to the photosensor; and pulsing the light at a selected frequency to minimize 1/f inherent system noise in the response of the accelerometer.

22 Claims, 17 Drawing Sheets

MICRO-ELECTRO-MECHANICAL SYSTEMS ULTRA-SENSITIVE ACCELEROMETER WITH INDEPENDENT SENSITIVITY ADJUSTMENT

RELATED APPLICATION

This application is a continuation-in-part of commonly assigned U.S. patent Ser. No. 09/892,301 filed Jun. 26, 2001 now U.S. Pat. No. 6,546,798 by inventors Richard L. Waters and Monti E. Aklufi. This related patent is incorporated by reference herein.

BACKGROUND OF THE INVENTION

This invention relates generally to perceiving acceleration upon an object. More specifically the invention relates to the devices used for making such perceptions, known as accelerometers and particularly an optical accelerometer created through the technology known as micro-electro-mechanical systems or "MEMS". With yet greater exactness, the invention relates to adjusting the sensitivity of such an accelerometer by selectively and independently positioning interferometers mirrors utilized in the invention.

Micro-electro-mechanical systems use microelectronic processing techniques wherein mechanical devices arc reduced to the scale of microelectronics. These processing techniques enable the integration of both mechanical and electrical components onto a single chip, typically made of silicon. Prior to MEMS, accelerometer components were for the most part manufactured separately. These components were then assembled together in a process that could easily be complex and expensive.

Current MEMS accelerometer designs have numerous advantages over their conventional counterparts. The MEMS accelerometers are of small size, light weight and low cost. Their sensitivity, however, has fallen largely in the low performance regime. Because of their relative low sensitivity and cost, current MEMS accelerometers have been used primarily in the automobile industry as collision airbag sensors and for other low sensitivity applications. Although the collision airbag sensor market is significant, it is but a small fraction of the potential market for low cost ultra-sensitive MEMS accelerometers.

Existing MEMS accelerometer technology is based upon either capacitive or piezo-based designs. State of the art MEMS capacitive accelerometers measure the charge on a capacitor to detect small movements of a proof mass attached to a spring. However, in order to detect sub milliG (1 G=9.8 m/s$^2$) perturbation forces with this technique, elaborate amplification circuitry capable of measuring on the order of nanovolt changes in potential is necessary. For example, typical steady state capacitance values for MEMS accelerometers are in the 100 fFarad range, where 1 f–10$^{-15}$. Furthermore, a 1 G accelerating force results in a minute change in capacitance, on the order of 100 aF where a=10$^{-18}$. This is equivalent to sensing a change of 625 electrons across the plates of a capacitor at an applied bias of 1 volt. Alternatively stated, this is commensurate with detecting the presence/absence of approximately 1 out of every 1000 electrons. To amplify this small change in capacitance extremely sensitive circuitry is required to translate the capacitance variations into a detectable voltage output signal. Even with the addition of low noise amplification circuitry, these MEMS accelerometers do not have the sensitivity required for many potential applications.

Piezoelectric or piezoresistive materials produce either a potential difference or a change in resistance when an external pressure/force is applied. This property lends itself to accelerometer designs. A shortcoming of piezoelectric or piezoresistive materials is that they are also pyroresistive, meaning that they change resistance with temperature. High sensitivity piezo-based accelerometers are therefore difficult to maintain. In addition, the resistance or change in potential of such accelerometers is usually extracted from a large resistor fabricated in the material. This large resistance leads to increased noise, e.g. resistive noise/Johnson noise. These problems are significant for piezo-based accelerometers. More commonly used accelerometers therefore use the capacitive method—which also suffers from noise but not as severely.

To realize the full potential of MEMS accelerometers, a significant improvement in sensitivity is required. Ideally, this improvement will minimize accelerometer inherent noise. Possible applications of such low cost, light weight, ultra-sensitive MEMS accelerometers include biomechanics, seismology, condition monitoring of machines and structures, and robotics. In addition, an ultra-sensitive MEMS accelerometer would dramatically improve the accuracy of guidance, navigation, and global positioning systems (GPS) that require sensitivity not on the order of the 1 G scale but rather the on the order of the $\mu$G scale or better.

The invention has structural similarities to an optical switch and amplifier described in the article titled: "Micromechanical Optoelectric Switch and Amplifier (MIMOSA)" by R. Waters et al, IEEE Journal of Selected Topics in Quantum Electronics, 5, 33 (January/February 1999) incorporated by reference herein.

SUMMARY OF THE INVENTION

The invention is an improvement upon an accelerometer based upon the monolithic integration of a Fabry-Perot interferometer and a p$^+$n silicon photodiode. The transmission of light through a Fabry-Perot etalon is exponentially sensitive to small displacements in the position of a movable mirror due to changes in an applied accelerating force. The photosensor converts this displacement to an electrical signal as well as provides for additional amplification. Because both the Fabry-Perot modulator and photodiode are monolithically integrated on a silicon substrate, the combination is compact and has minimal parasitic elements, thereby reducing the accelerometer's noise level and increasing its signal-to-noise ratio (SNR).

The sensitivity of the invention is user-controlled based upon any one or a combination of factors: adjusting the length between the mirrors of the Fabry-Perot etalon; adjusting the power of the light projected through the mirrors to the photodiode; and activating and deactivating the light at a selected frequency to minimize 1/f inherent system noise in the response of the accelerometer.

In the present design, the length between the mirrors of the Fabry-Perot etalon is adjustable by a mechanism lying outside of the optical path of the photodiode and that does not utilizing the photodiode itself as a conductor to aid in the adjustment of the mirrors.

The MEMS accelerometer of the invention is calculated to be capable of producing 1 V/G without the use of amplification circuitry. It is estimated that when amplification circuitry is used with the novel MEMS accelerometer of the invention, it will be more than three orders of magnitude more sensitive than present MEMS accelerometers using amplification circuitry. This implies that the $\mu$G sensitivity needed for navigation and GPS applications is obtainable if voltage levels on the order of 1 $\mu$V are detectable.

In opposition to prior art designs, the invention uses a light source rather than capacitive or piezo-based techniques for sensing acceleration. The advantages of this include use of a small wavelength of light for accurately measuring the movement of a suspended inertial mass and utilizing the wave nature of light for creating an exponentially sensitive accelerometer that is more than three orders of magnitude more sensitive than the previous art.

An object of this invention is to provide an accelerometer of high sensitivity.

Another object of the invention is to provide an accelerometer of high sensitivity in which inherent (1/frequency) noise is minimized.

A further object of this invention is to provide an optical accelerometer of high sensitivity.

Still another object of this invention is to provide an optical accelerometer in which light power is varied to adjust the accelerometer's sensitivity.

Still yet another object of this invention is to provide an optical accelerometer in which light power is varied to adjust the accelerometer's sensitivity by decreasing system inherent noise.

Still a further object of this invention is to provide an optical accelerometer in which light is selectively pulsed to adjust the accelerometer's sensitivity.

Still yet a further object of this invention is to provide an optical accelerometer that includes a Fabry-Perot etalon in which the distance between the etalon's mirrors is adjusted to adjust the accelerometer's sensitivity.

Yet another object of the invention is to provide an optical accelerometer that includes a Fabry-Perot etalon in which the distance between the etalon's mirrors is adjusted to adjust the accelerometer's sensitivity and in which this adjustment is done by a mechanism lying outside the light path of the accelerometer and that does not employ the light sensing mechanism to effectuate the mirror adjustment.

Yet still a further object of this invention is to provide an optical accelerometer of high sensitivity that is fabricated through micro-electro-mechanical system (MEMS) processing.

Other objects, advantages and new features of the invention will become apparent from the following detailed description of the invention when considered in conjunction with the accompanied drawings.

DESCRIPTION OF THE PREFERRED EMBODIMENT

Figure 1:
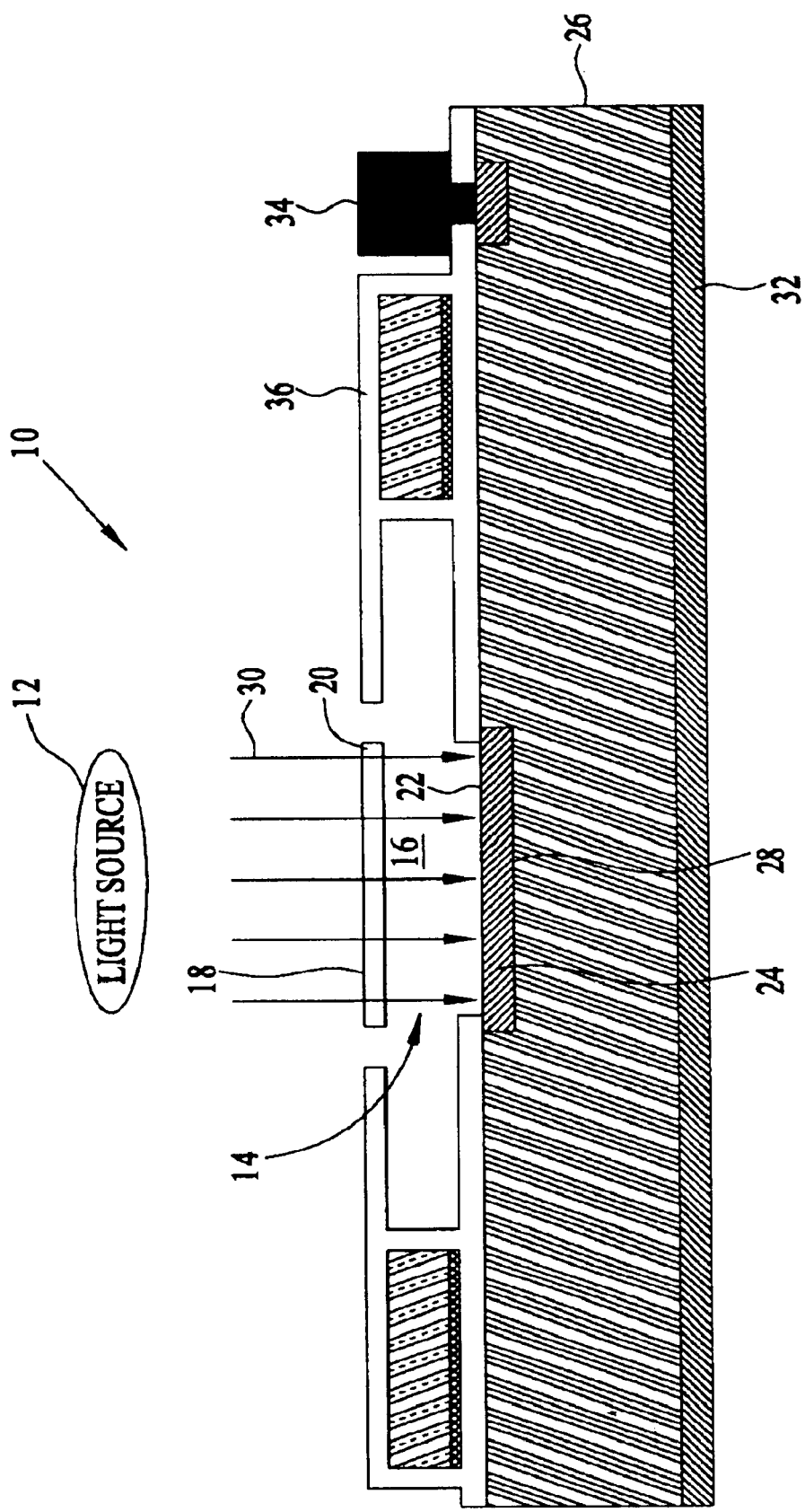
FIG. 1 is a side-section view of an accelerometer according to one embodiment of the invention described by the inventors in their above-cited patent.

Referring to FIG. 1, a micro-electro-mechanical system ultra-sensitive accelerometer (MEMSUSA) 10 as described by the inventors in the above-cited patent is shown by way of example. Accelerometer 10 lends itself to being made according to well-understood steps familiar to the semiconductor processing field and the MEMS world. Further description of this processing, therefore, will not be described here.

Accelerometer 10 utilizes a monochromatic light source 12 such as a fixed wavelength solid state laser, a light emitting diode or a vertical cavity surface emitting laser (VCSEL). This light is coupled directly or indirectly, such as via fiber-optic cable, to an interferometer 14. Interferometer 14, in this example, is a Fabry-Perot cavity 16.

This Fabry-Perot cavity is the optical cavity between upper and lower mirrors. In this case, a first or upper mirror 18 of the cavity is formed on the top surface of a hinged membrane 20 that is flexibly suspended above and substantially parallel to a second or lower mirror 22. Upper mirror 18 is designed to partially reflect and partially transmit light from and into cavity 16, such as may be accomplished by a thin semi-transparent mettalization on the top surface of membrane 20. Lower mirror 22 exists on the surface of a $p^+$ region 24 created in substrate 26 which is for example of silicon. Mirror 22 can be made for example by the semiconductor/air interface or via the deposition of a thin semi-transparent metal on the surface of region 24. Both mirrors 18 and 22 can be fabricated through the deposition of various dielectric layers, known as a dielectric stack, to form a dielectric mirror at a desired wavelength. In addition upper mirror 18 can have a thin conducting layer deposited either between the layers of the dielectric stack or on top of the stack to form an electrode for electrostatic actuation.

A $p^+n$ junction 28 creates a photodiode used to absorb light 30. Substrate 26 is disposed upon an $n^+$ substrate contact 32. The $p^+$ region reaches a metal contact 34 via a path not shown but within substrate 26. Of course, photodiodes of other configurations may be used, such as $n^+p$, pin and Schottky diode, for example.

Operation of the proposed device can be understood by examining both the transmission of light through the Fabry-Perot etalon for a fixed mirror spacing and for a change in mirror spacing such as will occur with an applied external force. A maximum in the transmission of light through the Fabry-Perot cavity, with monochromatic light incident normal to the surface of the mirrors, is achieved if the distance between the mirrors is an integral multiple of half wavelengths of the light. A maximum in light transmission through the cavity implies a maximum in the photo-generated current in the underlying photodiode of the structure. Further, one of the two mirrors of the Fabry-Perot interferometer is made such that it is hinged and therefore not rigidly fixed in position. In the example shown, the upper mirror is flexibly supported by four symmetrically located silicon dioxide beams 36.

Figure 2:
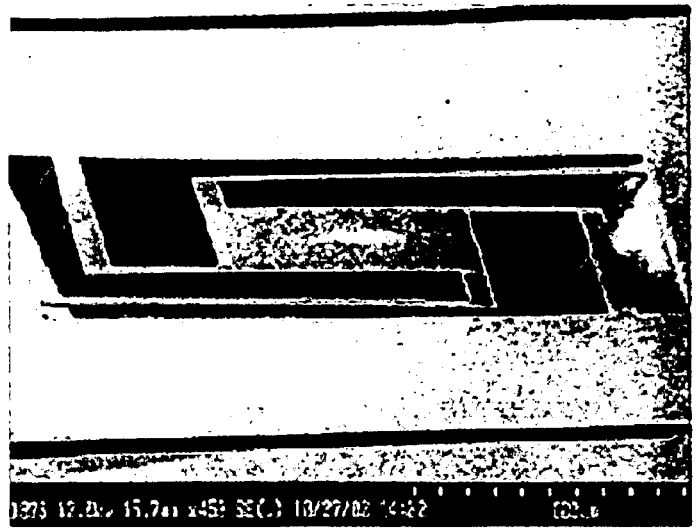
FIG. 2 illustrates an exemplary top view of an embodiment of the invention described by the inventors in their above-cited patent.
Figure 3:
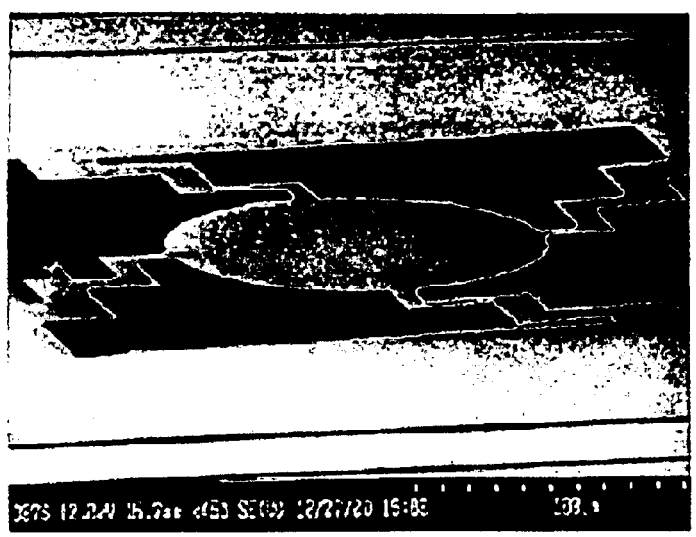
FIG. 3 illustrates an exemplary top view of another embodiment of the invention described by the inventors in their above-cited patent.
Figure 4:
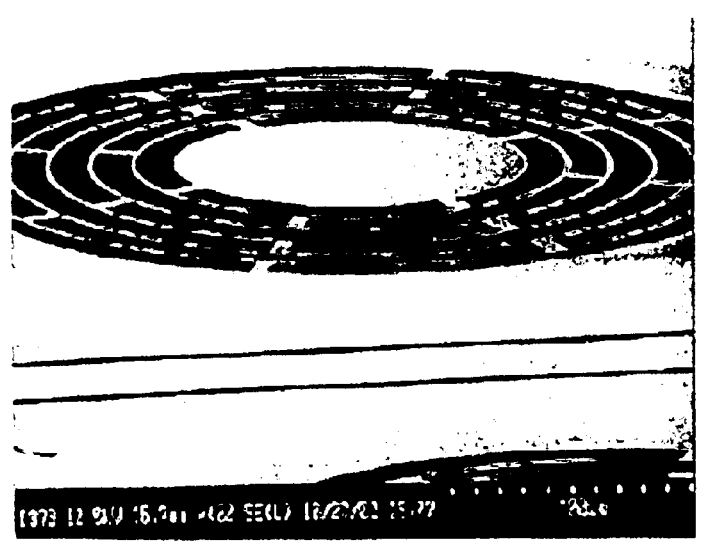
FIG. 4 illustrates an exemplary top view of yet another embodiment of the invention described by the inventors in their above-cited patent.

Two configurations of beam location for square and circular structures are shown in FIGS. 2 and 3, respectively. FIG. 4 illustrates multi levels of support beams. FIGS. 2–4 represent the top view of partially metallized upper mirrors which are deposited on a hinged membrane supported by support beams. The material used to fabricate the membrane and support legs need not be the same material and their size and geometry including the number of legs may change to adjust the sensitivity of the hinged mirror to applied external forces.

Figure 5:
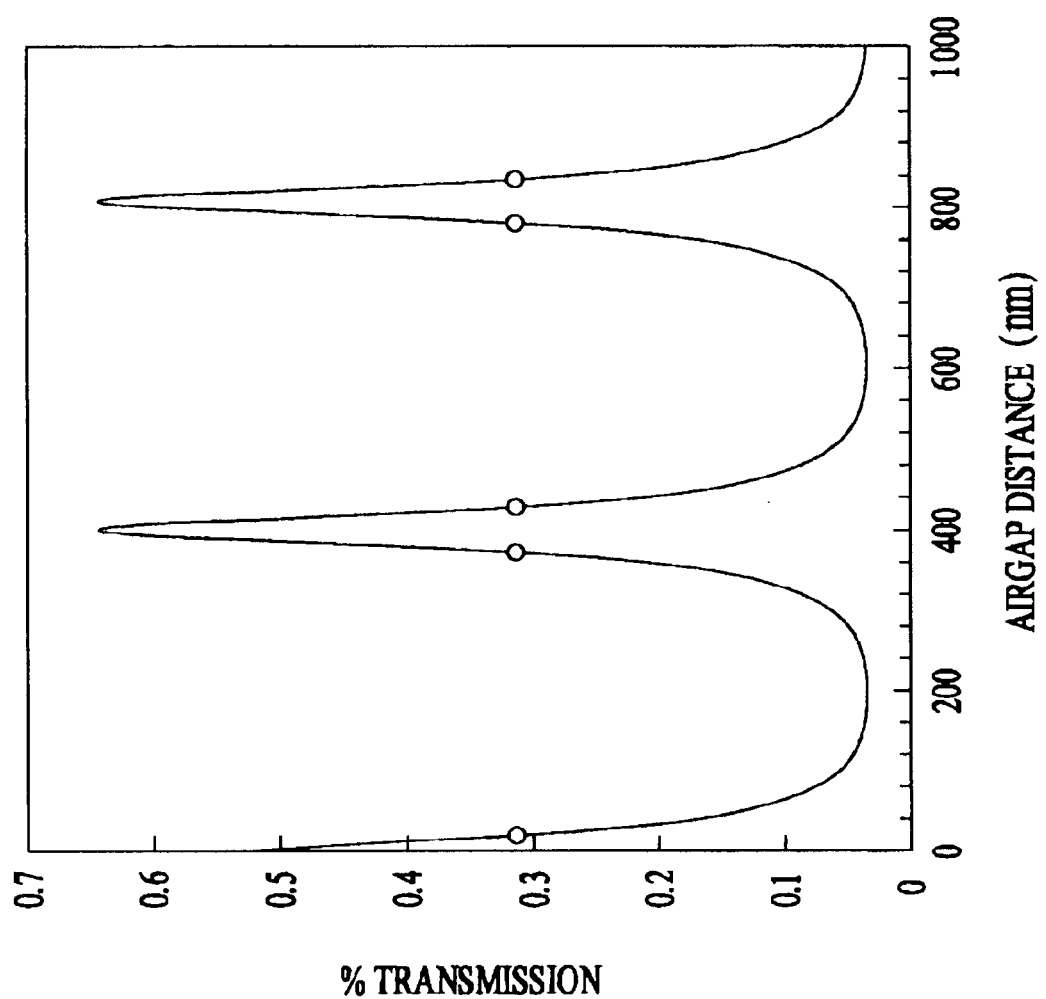
FIG. 5 describes graphically the relationship between light transmission and interferometer gap distance as described by the inventors in their above-cited patent.

As illustrated graphically in FIG. 5, applied forces due to acceleration or an electrostatic attraction between the mirrors will change the effective optical path traversing the cavity length between the mirrors causing an exponential change in the transmission of light into the photodiode. Depending upon the design of the structure, i.e. membrane material and thickness and cavity length (air gap) distance, multiple peaks and valleys of the transmission may occur as an external force is applied. Each peak/valley in the transmission corresponds to a different range of sensitivity due to a change in the effective spring constant. The "circles" in this graph show airgap (cavity length) distances of maximum sensitivity for the wavelength of light used. Thus, as will be discussed further, an applied bias across the mirrors can be used to tune the sensitivity range. Adjusting materials and geometries during the fabrication process can also be used to adjust the range of sensitivities.

Figure 6:
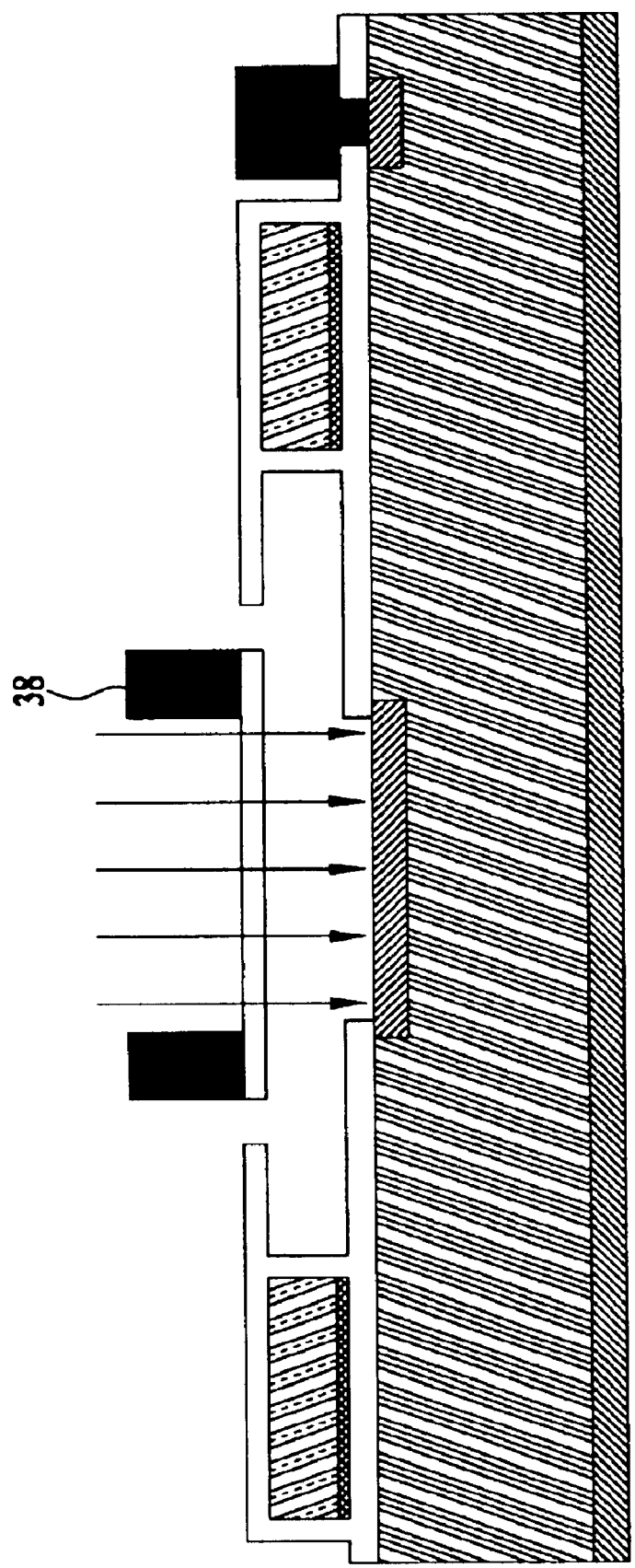
FIG. 6 shows a side-section view of the accelerometer of FIG. 1 modified by a weight added to its upper mirror as described by the inventors in their above-cited patent.

Referring to FIG. 6, another embodiment of this invention is shown in which metal weights 38 are patterned on the upper cavity mirror to provide an additional inertial mass to this movable mirror. The weights in this instance also serve to restrict light to only the p-n junction region, thus decreasing the steady-state light absorbed and therefore increasing the on/off ratio of the sensor. Of course, one will realize that other weight material besides metal may be used in this application. For example, wafer bonding techniques may be used to provide one or more silicon weights as inertial mass for the invention. Other weight materials and other techniques of applying/attaching weight materials are also of course possible.

Figure 7:
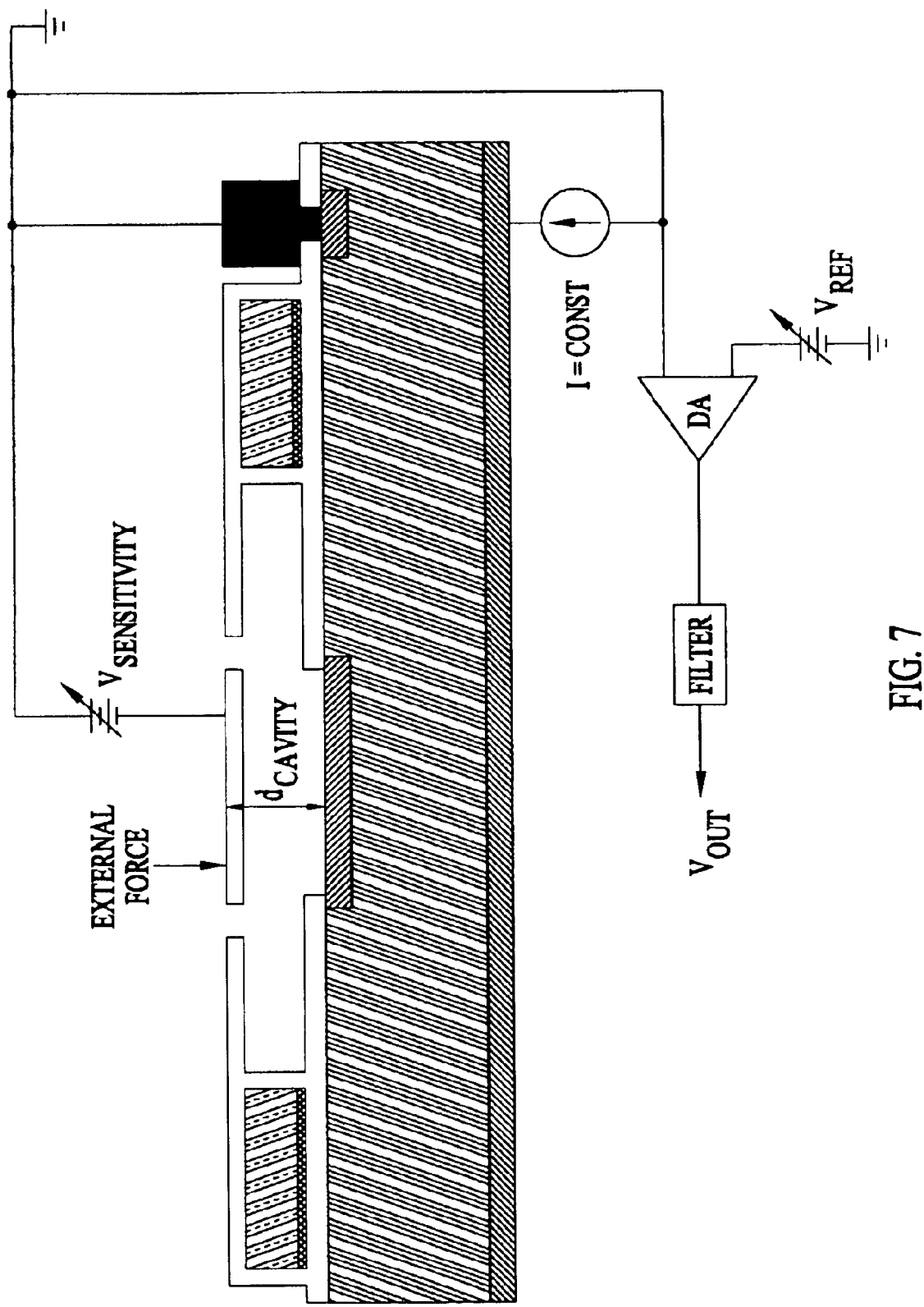
FIG. 7 shows a generalized wiring diagram used in conjunction with the embodiment of the invention of FIG. 1 as described by the inventors in their above-cited patent.

FIG. 7 illustrates one possible biasing configuration in which sensitivity of the accelerometer can be surmised. In this figure, a constant current is applied through the photodiode while the voltage, Vsensitivity, is adjusted to maintain a constant force on the upper mirror, thus insuring a constant desired air gap (cavity length d) and photodiode current. The control voltage, Vsensitivity, is then compared to a reference voltage (Vref) and the difference is amplified and filtered. In this simplified configuration, the output voltage can be directly related to the force applied perpendicularly to the upper mirror. Hence a change in the output voltage can be used as a measure of the acceleration force.

Figure 8:
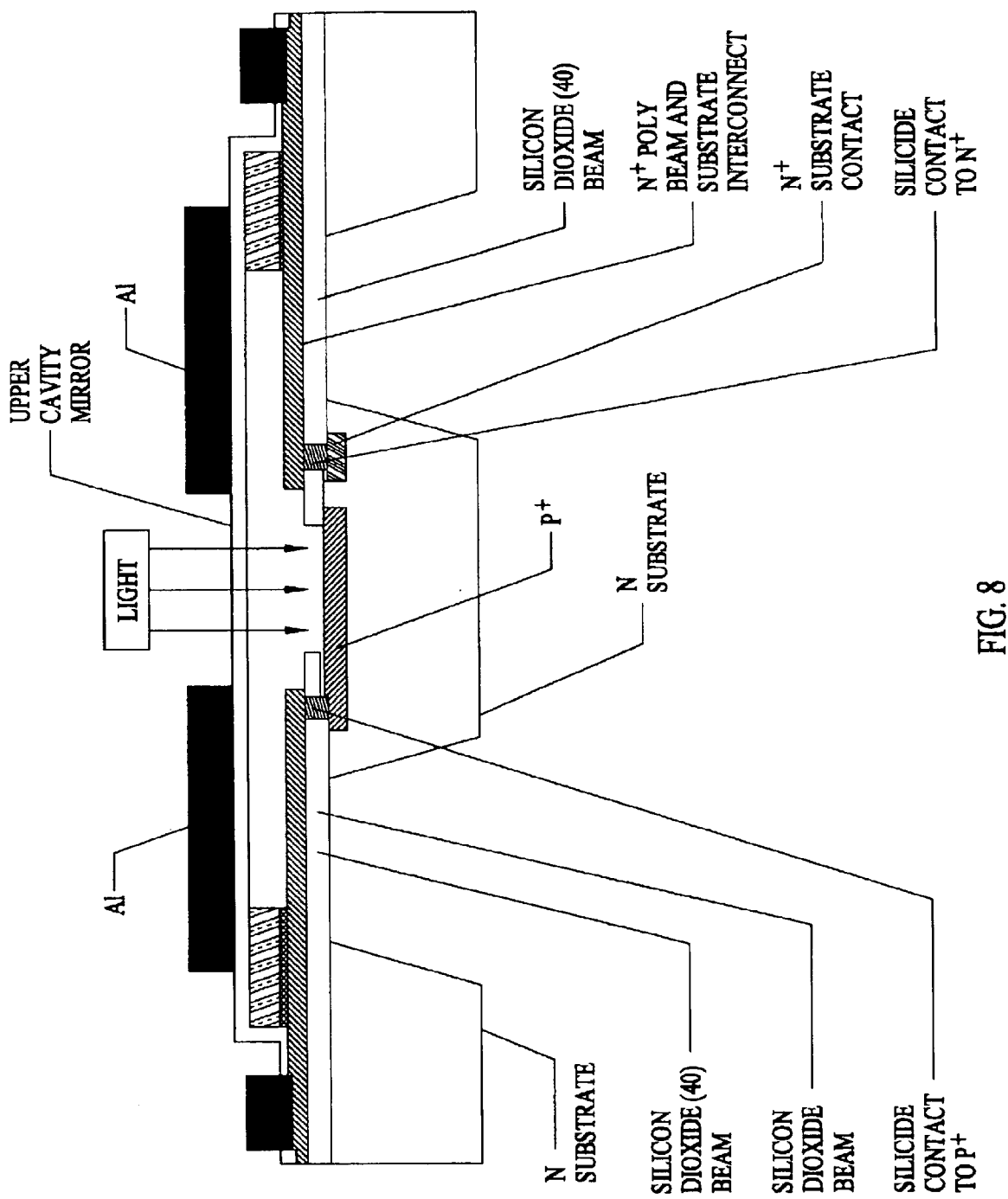
FIG. 8 depicts yet another embodiment of the invention as described by the inventors in their above-cited patent.

FIG. 8 is yet another embodiment of the invention shown in this case with exemplary materials described. To further increase the inertial mass for high sensitivity applications, a lower cavity mirror including a $p^+n$ photodiode, is flexibly supported by cantilevered beams, 40. The upper cavity mirror in this embodiment is rigidly supported.

Figure 9:
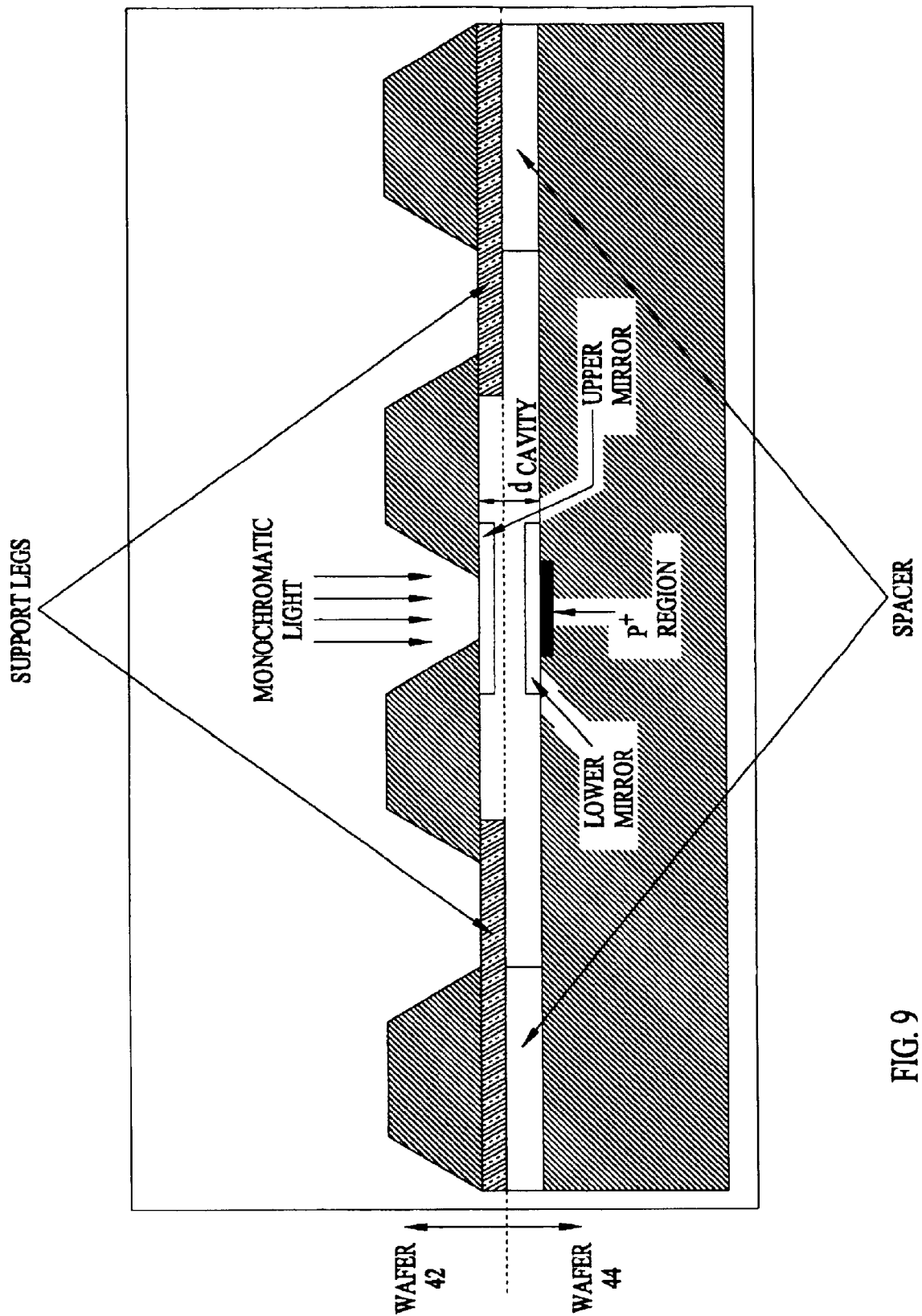
FIG. 9 shows a further embodiment of the invention as described by the inventors in their above-cited patent.

Alternatively, FIG. 9 shows a top mirror made from a bulk silicon wafer. In this alternative configuration of the accelerometer, two wafers 42 and 44 are bonded together by heat or pressure. Wafer 42 defines an upper mirror configuration and supporting legs/springs. These supports may be of the same composition as the upper mirror or of a different composition. In this embodiment, backside etching through wafer 42 is used to define an optical opening through which monochromatic light may be illuminated onto the upper mirror. Wafer 44 defines the lower mirror configuration as well as a spacer used to separate the two mirrors. Wafer 44 also includes a diffused p-type region under the lower mirror. The thickness of the spacer of wafer 44 together with the thickness of the supporting legs/springs of wafer 42 define the effective optical cavity length "d" of this configuration. In this embodiment, wafer 42's substrate gives an additional inertial mass to the upper mirror thereby increasing its displacement for a given acceleration and increasing the sensitivity of the accelerometer.

Figure 10:
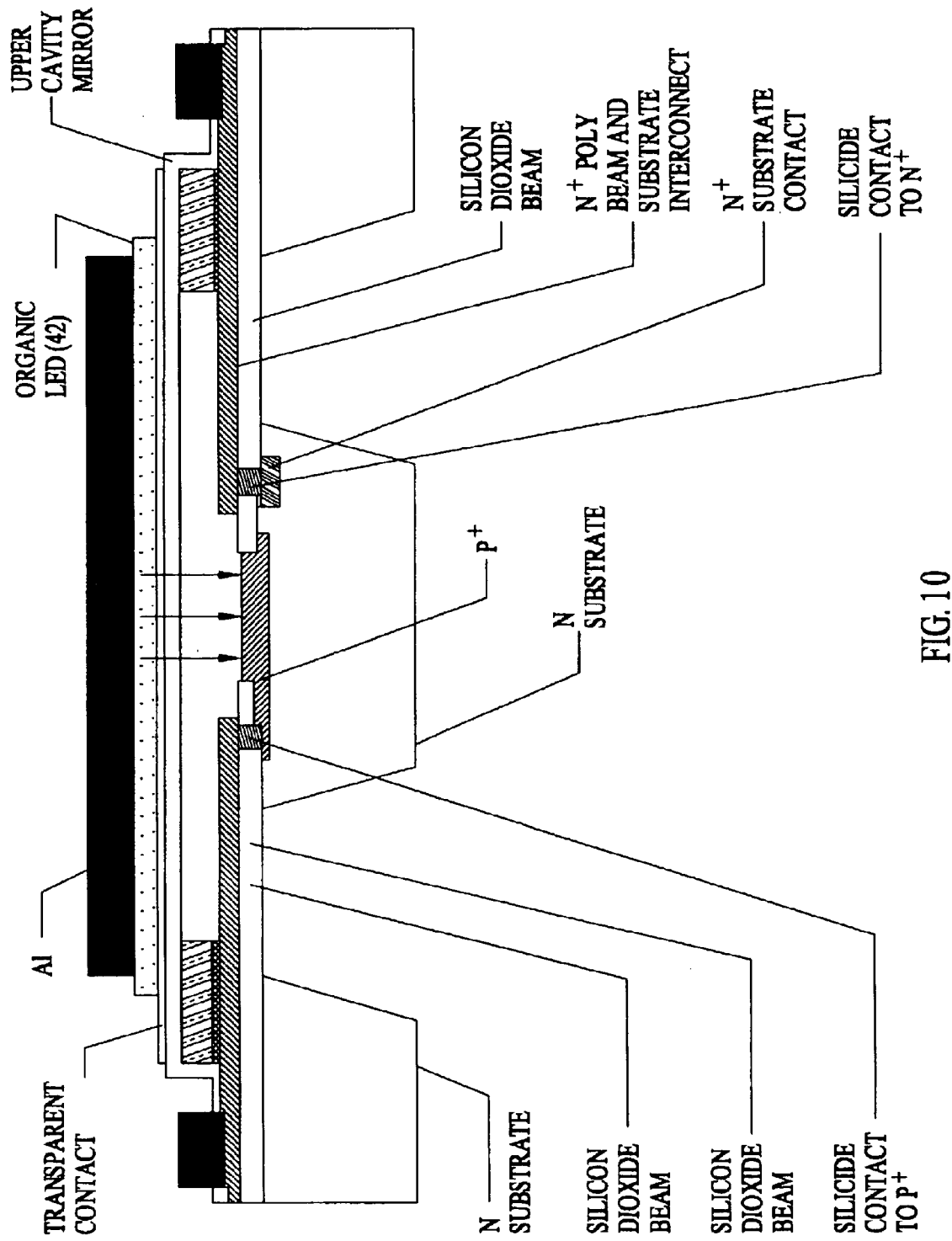
FIG. 10 illustrates another embodiment of the invention incorporating a light emitting diode as described by the inventors in their above-cited patent.

Depending upon the design and geometry of the sensor as discussed above, a number of methods can be used to bring light into the structure. These methods include epoxy bonding a solid state laser or light emitting diode to a packaged optical accelerometer possessing a clear optical window. Another choice is to wafer bond vertical cavity surface emitting lasers (VCSEL) such that they are suitably positioned over the optical cavity. In addition, FIG. 10 illustrates how organic LEDs 46 can be deposited on a rigidly attached transparent membrane. This embodiment is shown with exemplary materials identified. Fiber optic cables can also be used to bring light into the structure. The fiber optic cables may be aligned to the top mirror of the membrane by any suitable alignment techniques such as selectively etching alignment marks in the silicon or etching precision openings in the bulk silicon to allow the fiber optic core to align with the top mirror, etc.

In all of the embodiments, Pulse Width Modulation (PWM) of the light used can be performed to avoid the characteristic one over frequency noise (1/f) that plagues current accelerometers, thereby enhancing the sensitivity of the accelerometer. Instead of having a constant intensity light source, the source will be pulsed with some characteristic frequency, fl, such that the electrical signal generated by the accelerometer is at fl plus the maximum response of the accelerometer. Since the 1/f noise decreases with frequency, shifting the accelerometer response to a higher frequency will reduce the noise from this source. The 1/f noise is inherent in all accelerometers and electronic circuits, it can not be avoided by simple mechanical means.

A unique advantage of the invention is its ability to vary accelerometer sensitivity level by adjusting input light intensity. In the quantum mechanical limit, photodiode noise (shot noise) increases linearly with the square root of the input light power. At the same time, however, the detected electrical signal in the photodiode varies linearly with the input light power. Therefore, the ratio of the detected signal to the noise generated within the photodiode increases as the square root of the input power. This increasing signal to noise ratio (SNR) with increasing optical power allows one to adjust or increase the sensitivity of the accelerometer by increasing the light power incident upon the photosensor.

As previously described, the invention also lends itself to sensitivity adjustment via changing of the distance between the accelerometer's mirrors. This distance is easily altered by applying a selected potential across the mirrors.

Though the invention has been described in terms of Silicon, similar structures can be fabricated in a material system other than Silicon, such as Indium Phosphide (InP) or Galium Arsenide (GaAs), for example. These will also allow monolithic integration of a light source with a photodiode and membrane structure. In cases where applicable, upper and lower mirrors may be fabricated on separate wafers by ionic, heat or pressure bonding.

Figure 11:
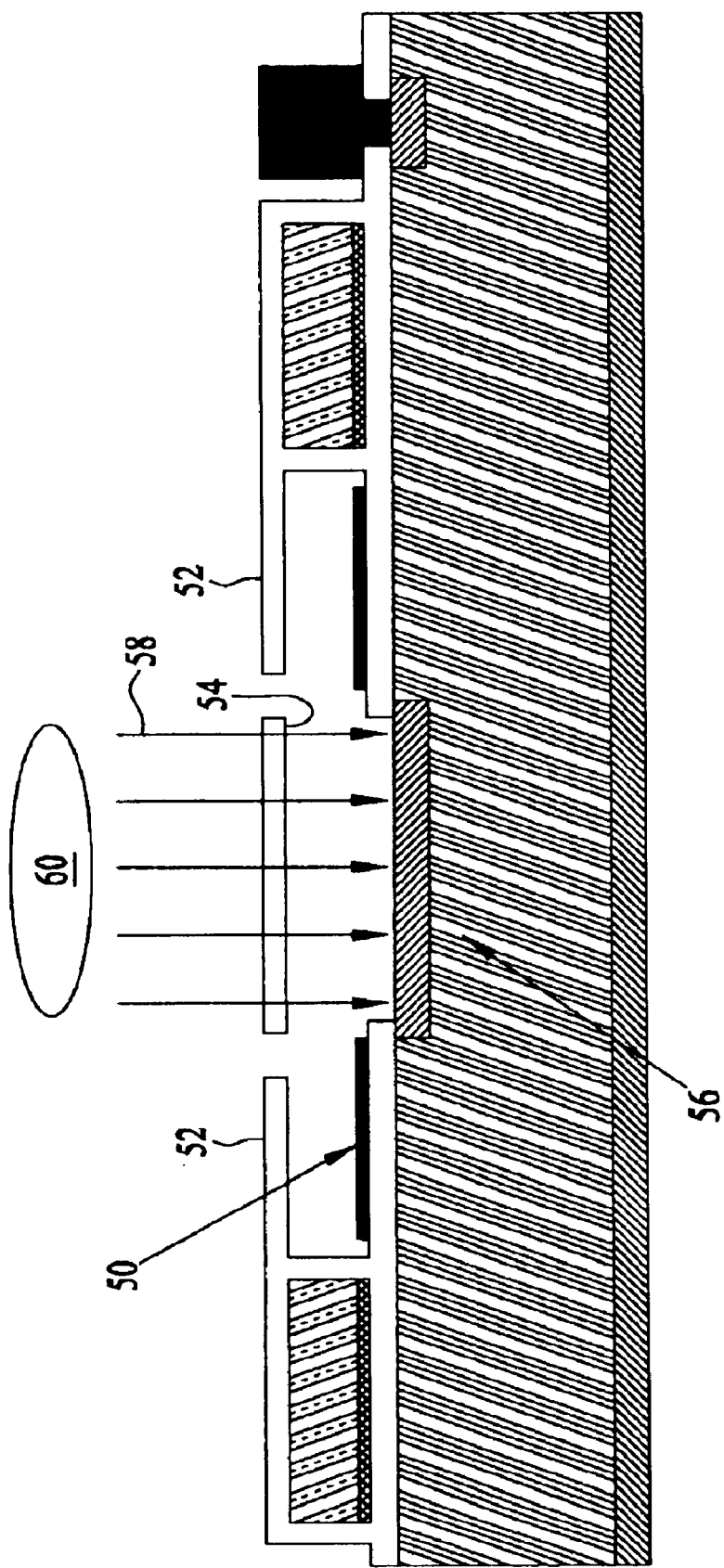
FIG. 11 is like FIG. 1 but illustrates placement of a mirror conductor according to one embodiment of the present invention.

Referring now to FIG. 11, the present invention will be described. The present invention is an improvement upon the above-described accelerometer design. As described above, one mechanism for enhancing the sensitivity of the MEMS accelerometer is for the user to adjust the cavity length (air gap) between the accelerometer's interferometer mirrors.

In the previously described embodiment of the invention, this adjustment is accomplished by providing a potential between the photodiode and the flexibly suspended mirror. By generating an electrostatic attraction between these elements, it is possible to cause the two interferometer mirrors to converge. While this method of accelerometer sensitivity adjustment has its merits, there are some drawbacks that in cases will detract from accurate accelerometer readings.

It has also been realized that under certain conditions current absorbed in the photodiode photosensor of the invention generates a voltage that can adversely affect accurate relative positioning of the mirrors. It is also desirable at times to bias the photodiode photosensor and this in turn can also adversely affect the relative positioning of the interferometer mirrors.

Figure 12:
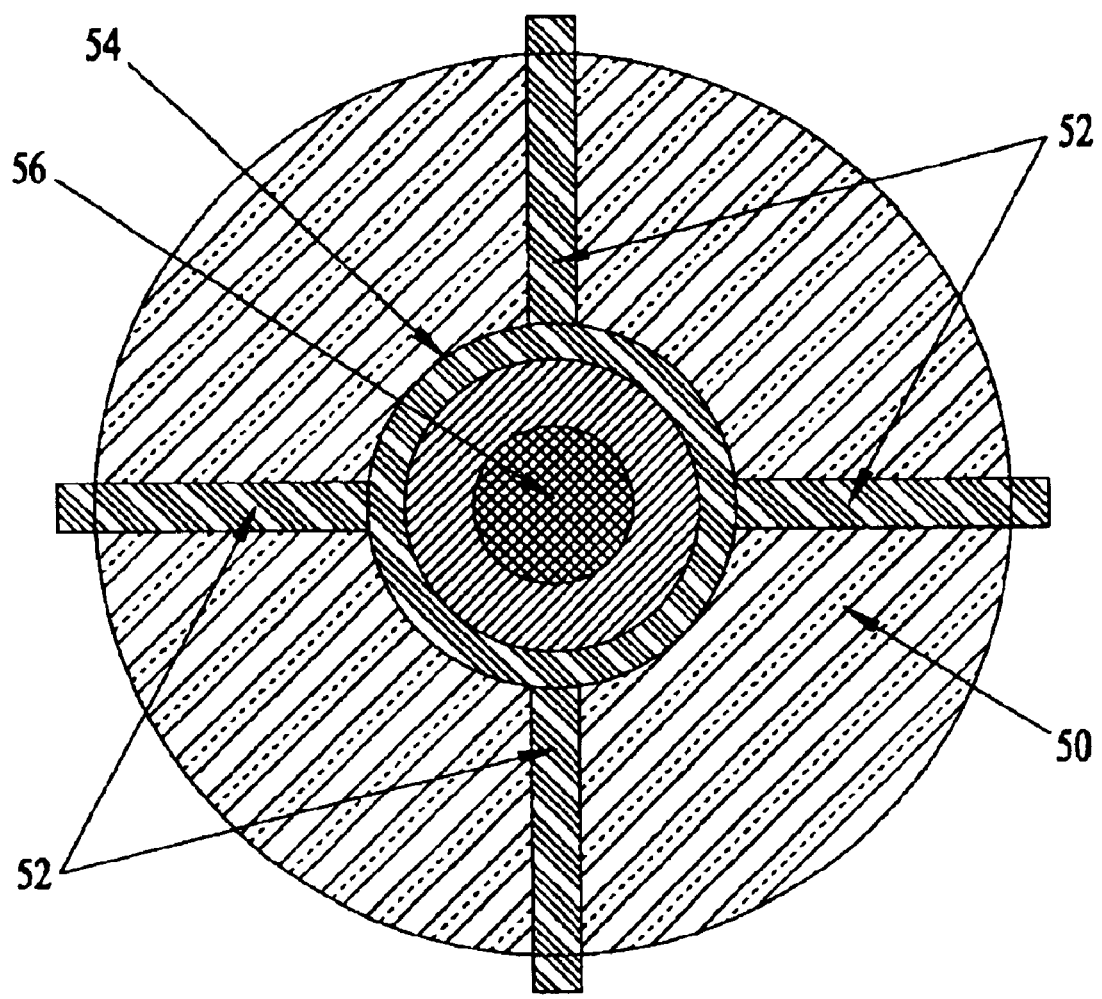
FIG. 12 illustrates one embodiment of a mirror conductor as may be used with the present invention.
Figure 13:
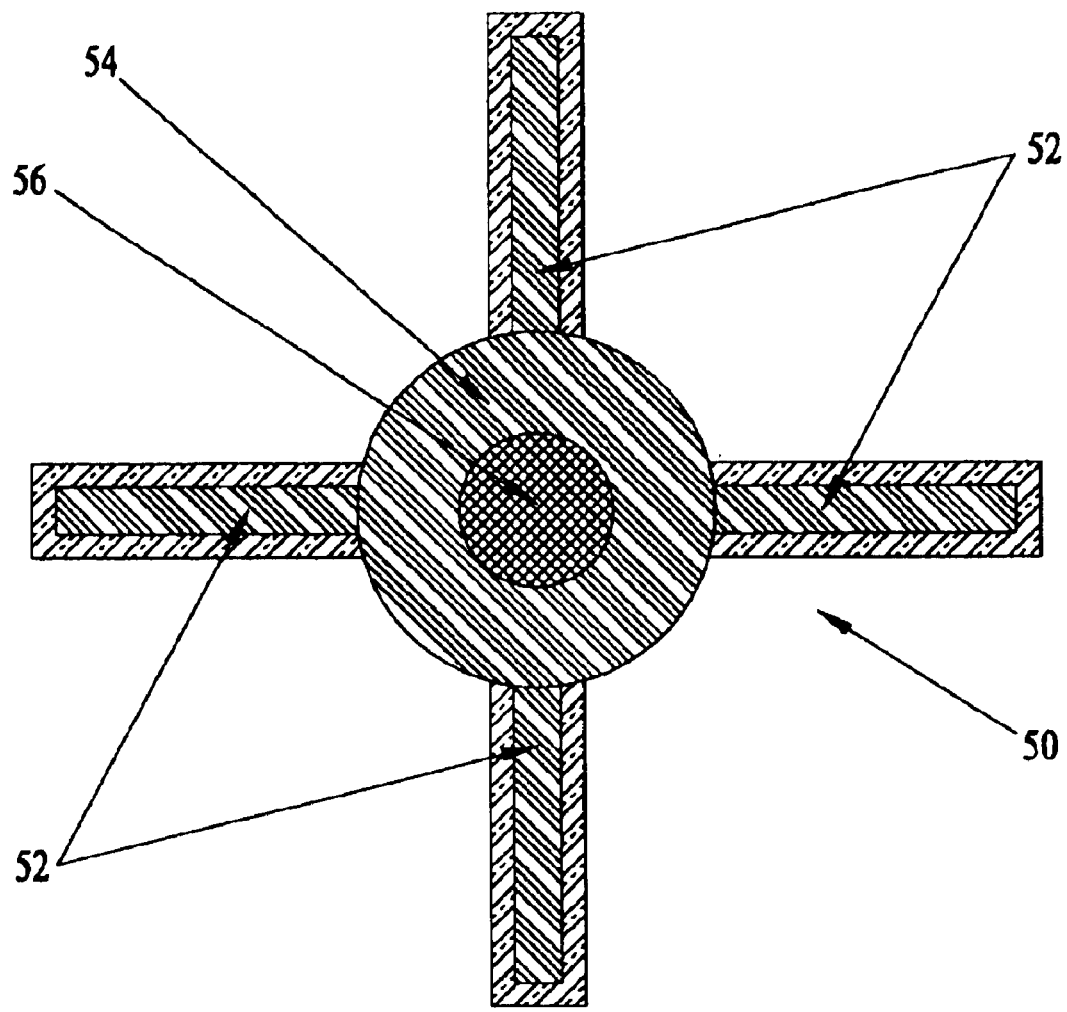
FIG. 13 illustrates one embodiment of a mirror conductor as may be used with the present invention.

In FIG. 11, a grid electrode 50 is shown in this cross-section as located generally between the springs/support structure 52 of first mirror 54 and photosensor 56. As can be seen in this figure, electrode 50 is disposed outside a path 58 of light source 60. FIGS. 12 and 13 illustrate two variations on how the grid electrode may be patterned. As can be seen in FIG. 12, grid electrode 50 takes the shape of a concentric ring, shown in this figure further from the viewer than mirror 54 and supports 52. A path is provided through this ring so that photosensor 56 can be illuminated through the central void defined by the electrode. In FIG. 13, mirror 54 and accompanying supports 52 are closest to the viewer while electrode 50, not shown in this figure, is disposed directly underneath supports 52. Of course, other geometrical patterns and variations for the grid electrode exist that may allow for increased sensitivity and/or control of the suspended mirror displacement.

Figure 14:
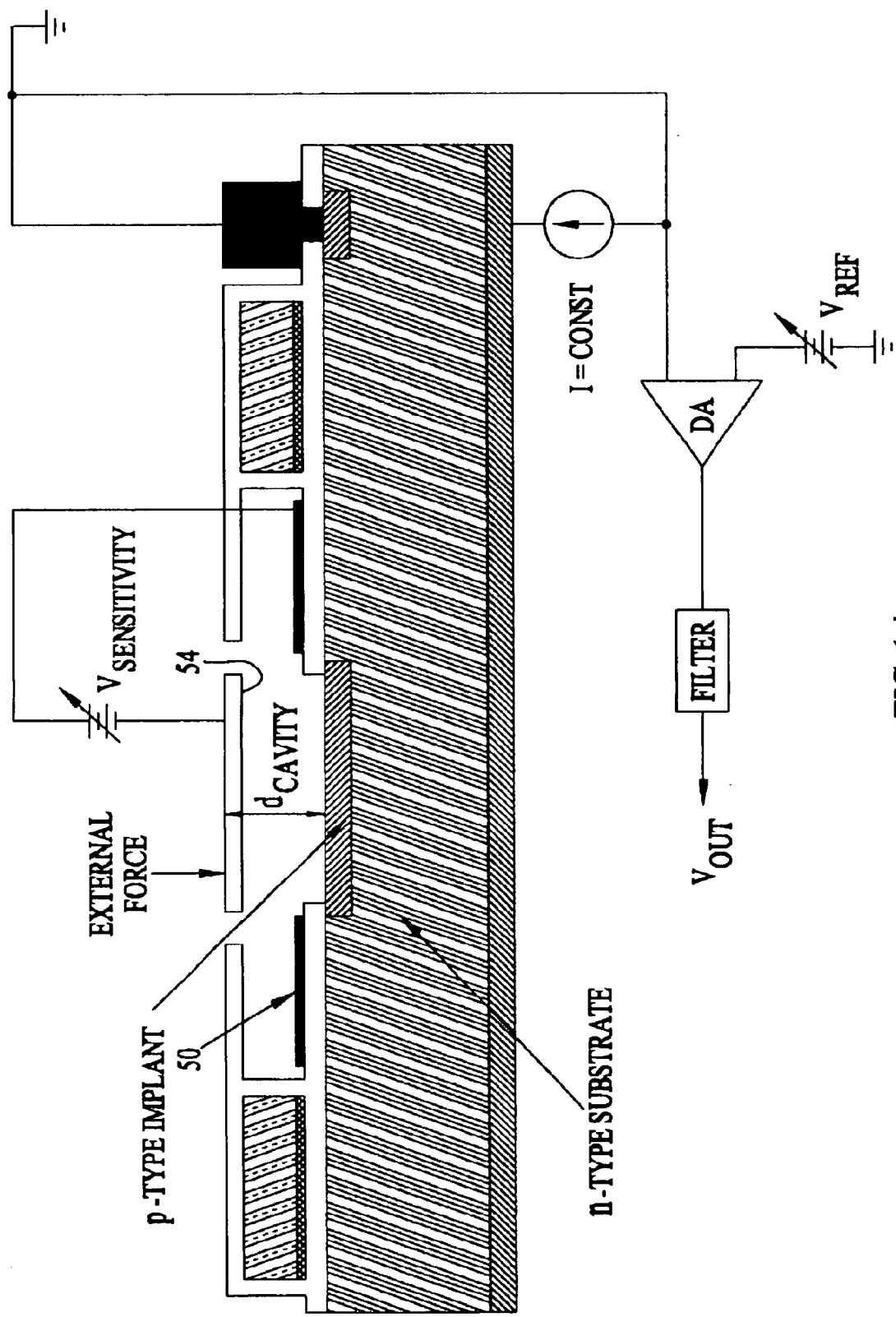
FIG. 14 is like FIG. 7 but illustrates placement of a mirror conductor and its generalized wiring diagram according to an embodiment of the present invention.

Referring now to FIG. 14, to provide selective mirror positioning, the grid electrode may be maintained at a constant voltage and the voltage on the flexibly suspended mirror changed, or the voltage on the flexibly suspended mirror is kept constant and the voltage on the grid electrode changed.

The grid electrode may be used in a force-rebalance mode to decouple feedback from the accelerating force sensing element (in this case flexibly suspended mirror 54). The force rebalance mode keeps the total force on this mirror constant such that, the force due to input acceleration plus the capacitive force exerted by the grid electrode on mirror 54 is constant. This is achieved by applying a variable potential to the grid electrode thus adjusting the capacitive force as the input accelerating force changes, resulting in a constant total force applied. This also prevents stiction of the upper mirror to the lower mirror which has been reported to be a common problem for the prior art.

The grid electrode also shields the upper (first) mirror from any capacitive force exerted by the photosensor substrate. The capacitive force from this substrate is undesirable because its potential and hence force may change as the acceleration changes and hence collected current in the photodiode changes. Depending upon the point of operation this feedback can be either positive or negative.

The grid electrode allows not only the initial cavity length between the interferometer mirrors to be adjusted but also allows adjustment of the effective spring constant of the mirror support structure. The ability to independently adjust the spring constant allows the dynamic range of the accelerometer to be adjusted.

Figure 15:
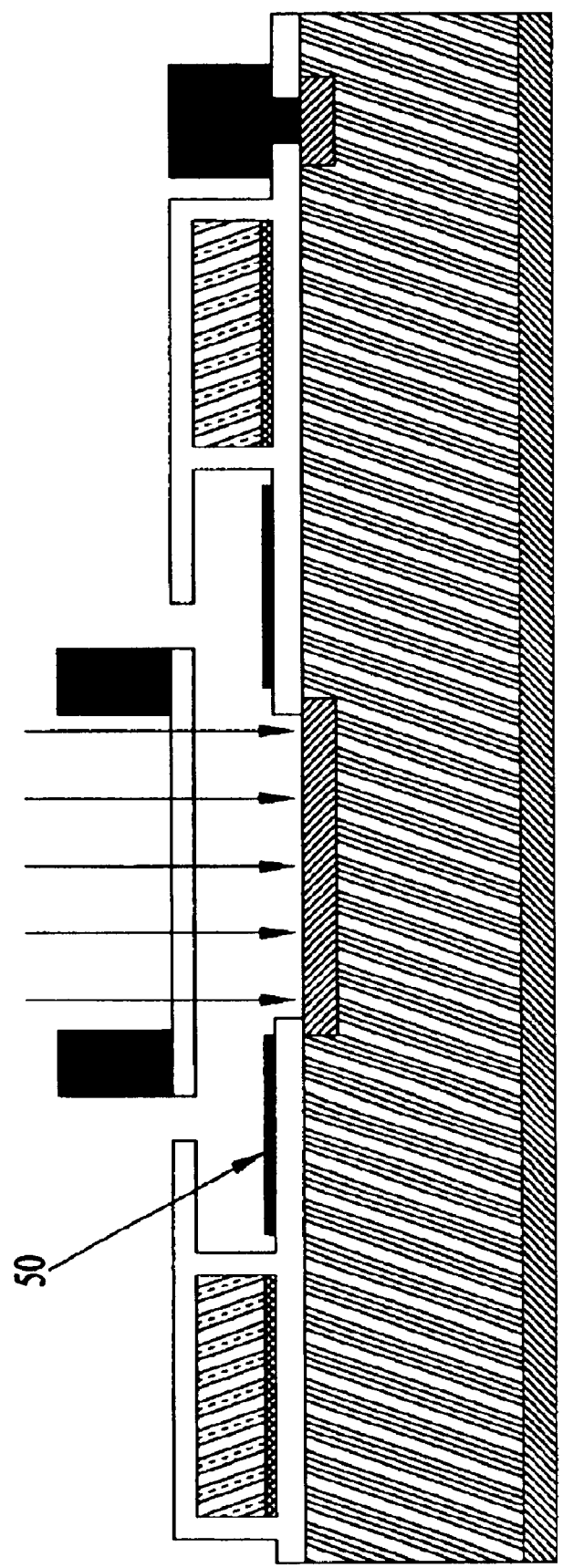
FIG. 15 is like FIG. 6 but illustrates placement of a mirror conductor according to another embodiment of the present invention.
Figure 16:
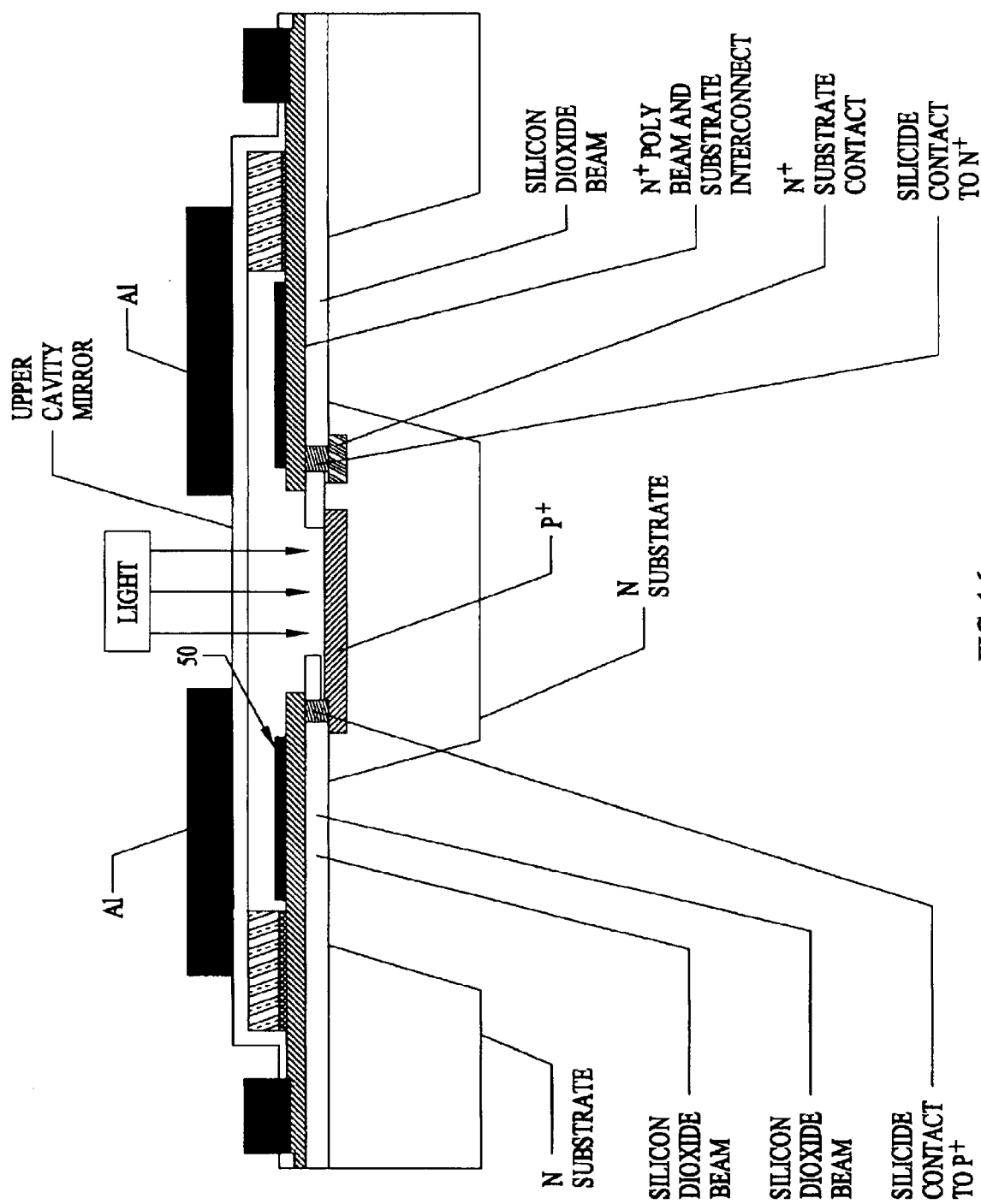
FIG. 16 is like FIG. 8 but illustrates placement of a mirror conductor according to another embodiment of the present invention.
Figure 17:
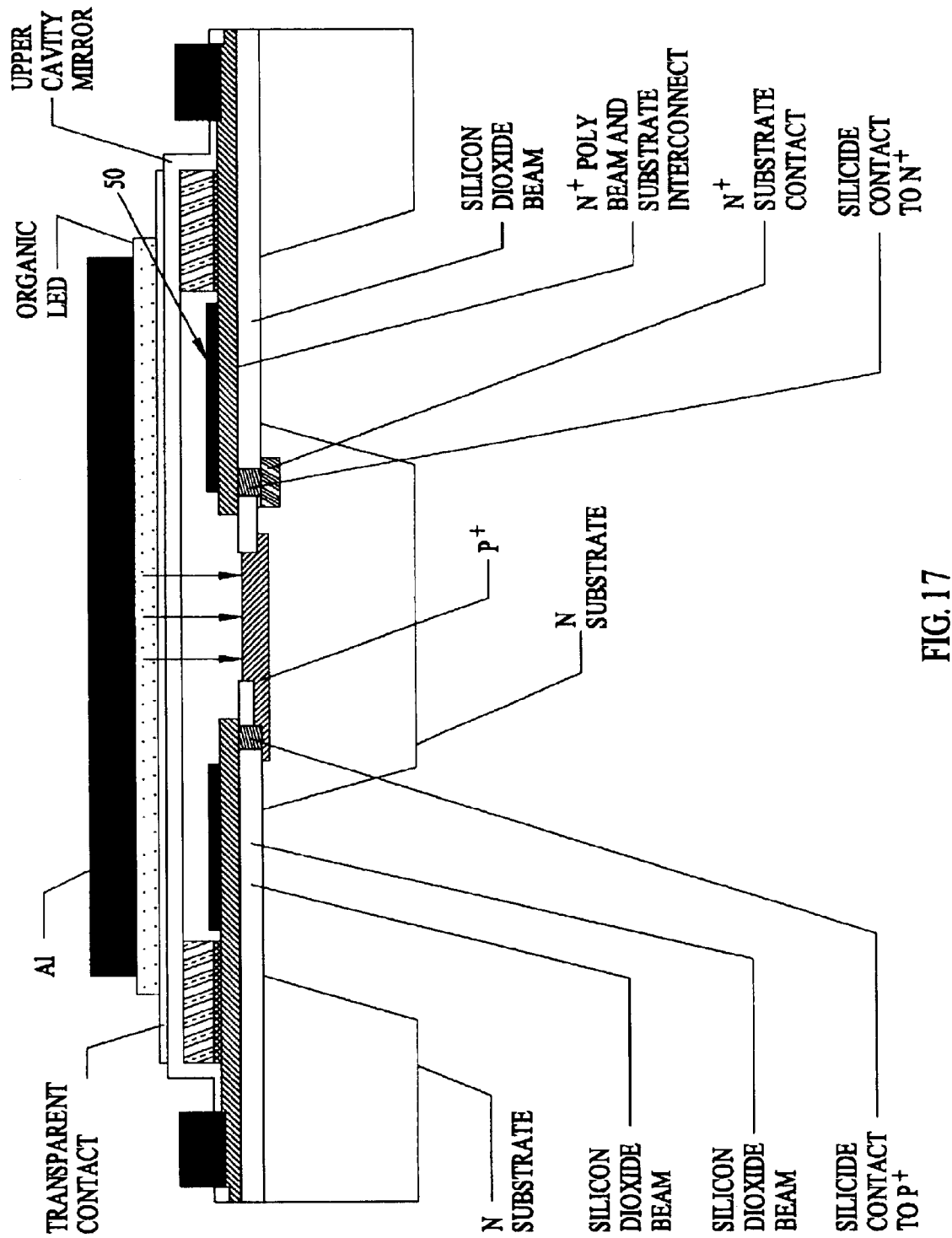
FIG. 17 is like FIG. 10 but illustrates placement of a mirror conductor according to another embodiment of the present invention.
Figure 18:
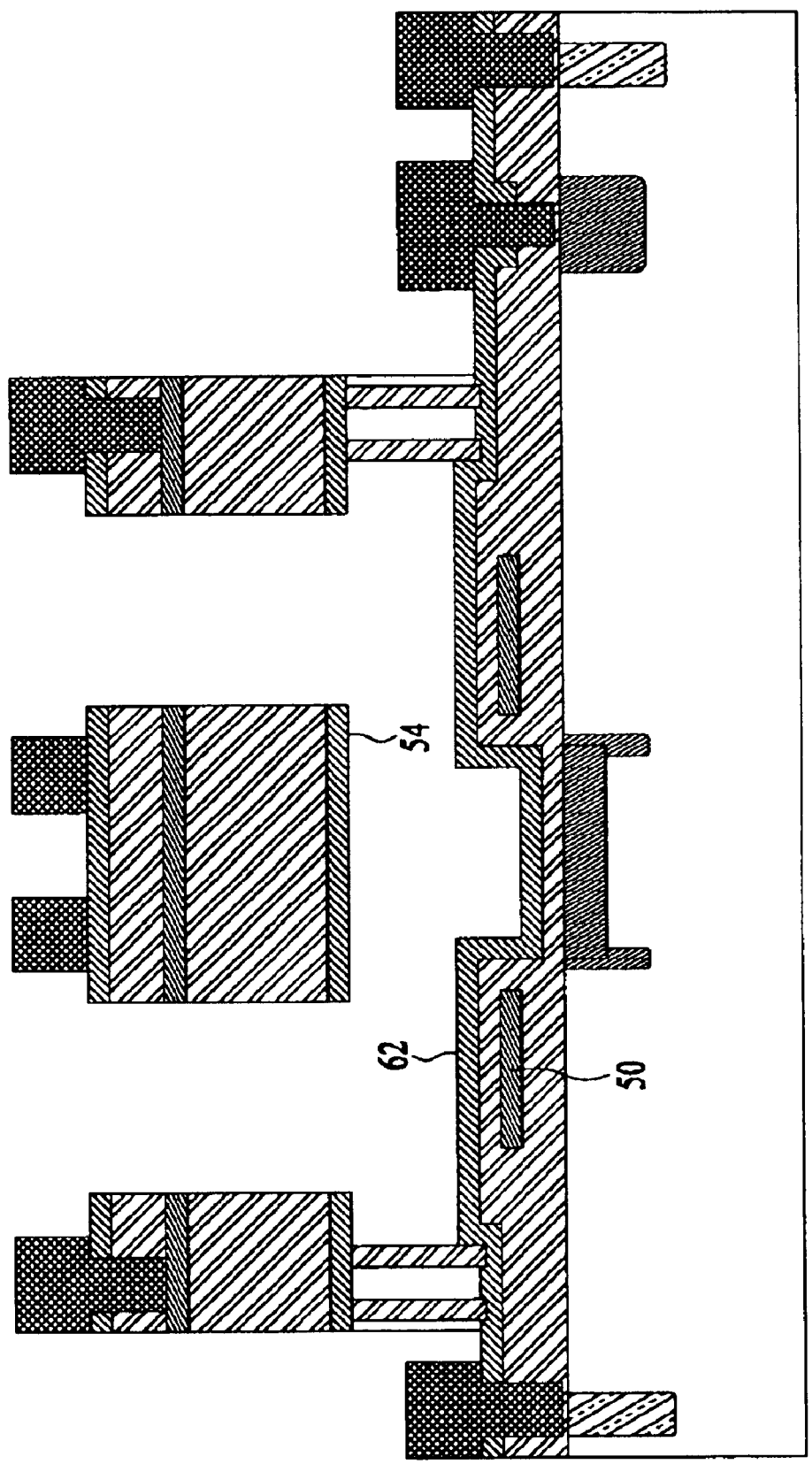
FIG. 18 illustrates placement of a mirror conductor according to another embodiment of the present invention.

FIGS. 15–17 show alternative arrangements of utilizing such an electrode with many of the embodiments of the accelerometers described above. FIG. 18 illustrates an optical sensor wherein electrode 50 is encapsulated underneath mirror 62 and within a region below the spring/support structure of mirror 54.

Figure 19:
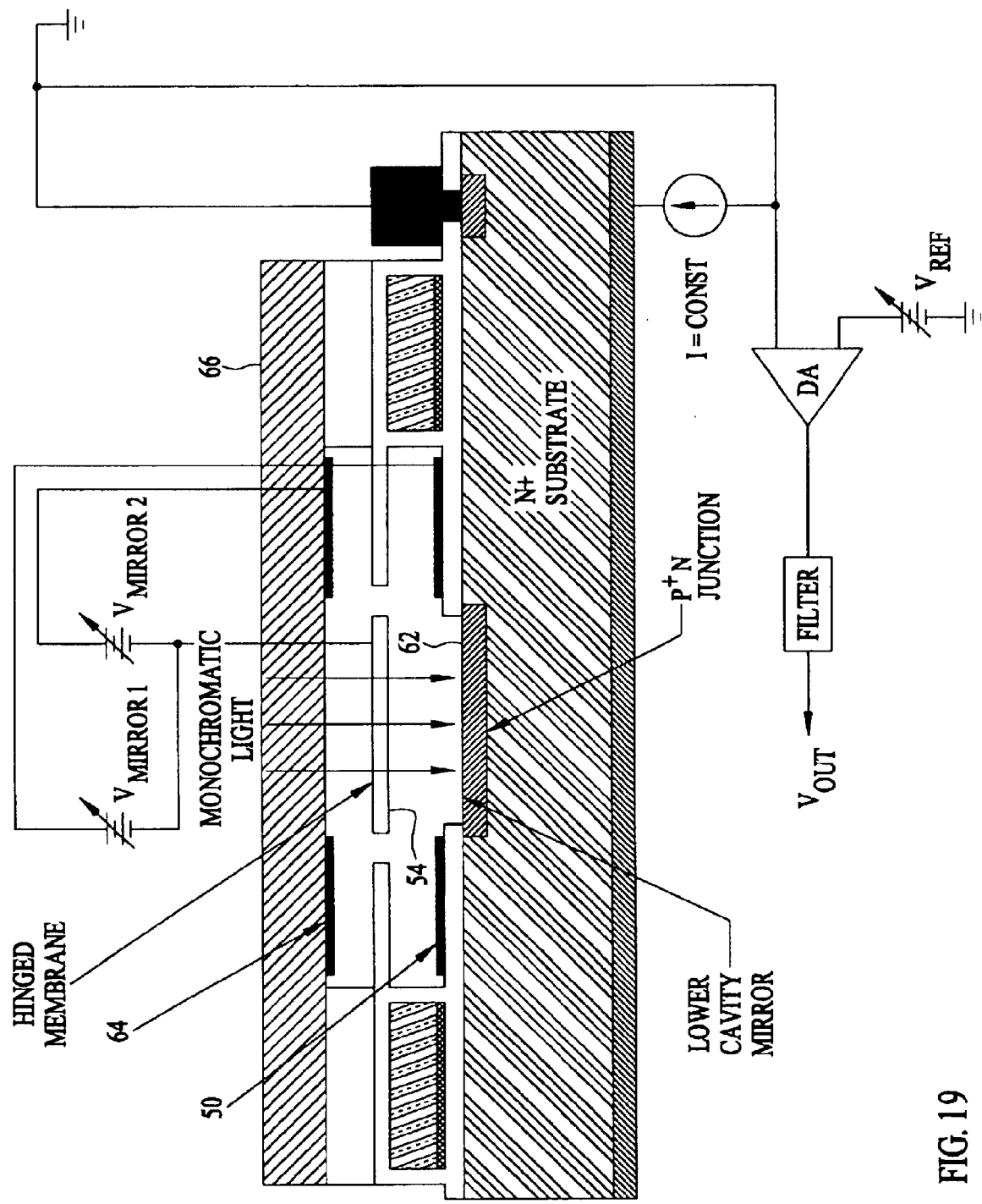
FIG. 19 is like FIG. 16 but further illustrates placement of a second mirror conductor and its generalized wiring diagram according to an embodiment of the present invention.

FIG. 19 shows another embodiment of the invention in which an electrode 64 is disposed to draw mirror 54 away from mirror 62. Electrode 64 may be effectuated via wafer bonding a suitable substrate 66 with patterned electrodes. Use of such an "upper" electrode is possible in conjunction with the previously described grid electrode, as is shown in FIG. 19. One advantage of this technique, among others, is the ability to adjust the interferometer cavity length in both positive and negative directions.

There are numerous advantages in using control electrodes in conjunction with an accelerometer as described herein.

The invention provides independent control of the accelerometer's spring constant. By varying the spring constant, the dynamic range of a particular accelerometer sensor may be adjusted. Identical accelerometers may be arrayed such that the spring constant for each is adjusted. In this manner, the overall dynamic range of the composite accelerometer array is increased over that of an individual accelerometer sensor.

By using the invention, it is possible to decouple feedback from the accelerometer's force sensing element, i.e. feedback control is obtained via the control electrode as opposed to a voltage directly on the sensing element.

The invention permits adjustment of the accelerometer's cavity length to accommodate tuning to an optimal operating point.

The invention allows for the local adjustment of the potentials on either side of the photosensor diode junction, e.g. the potentials on the p+ and n regions of the photodiode can be adjusted without affecting the net force that the force sensing element feels. This ability to adjust the potentials across the photodiode also increases flexibility in the design of control/interface electronics.

In the event that an unwanted spurious external/internal force acts upon the force-sensing element of the accelerometer, the control electrode can be used to apply a force equal and opposite to counter balance (or force rebalance) the system and adjust the net force to zero. In the "force rebalance mode" described, the control electrode helps to prevent stiction of one interferometer mirror to the other while simultaneously decoupling the interferometer cavity length adjusting force from the accompanying photosensor.

A further advantage of the invention is that field lines generated by the photosensor substrate terminate on the control electrode thereby shielding these from the upper interferometer mirror, thereby decoupling movement of this mirror from the bias on the substrate.

The control electrodes described are not meant to be directed towards a single "lower" and a single "upper" electrode. One may incorporate a series or matrix of electrodes disposed at either location and still fall within the spirit of the invention and described herein.

Though the invention has been described as a sensor for sensing acceleration, it is by no means limited to this particular application. It can be envisioned that various other force sensing applications of the invention are possible. Included among these, but without limitations thereto, are sensing application in the inertial, magnetic, pressure, electrostatic and thermal areas for example.

In addition, the invention has been largely described by way of example to employ a monochromatic light source. The invention is however also considered usable with light of a plurality of colors or wavelengths.

Obviously, many modifications and variations of the invention are possible in light of the above description. It is therefore to be understood that within the scope of the claims the invention may be practiced otherwise than as has been specifically described.

What is claimed is:

1. An apparatus comprising:
    a pair of partially transmissive, partially reflective, surfaces wherein a first of said surfaces is flexibly suspended adjacent and substantially parallel to a second of said surfaces, said surfaces defining a cavity and a cavity length therebetween;
    a photosensor attached to one of said surfaces outside of said cavity;
    a source of light, said light for irradiating said photosensor through said first and second surfaces wherein said light is also partially reflected between said surfaces; and
    a cavity length adjustor independent of said photosensor for adjusting said cavity length,
    wherein a change in said cavity length is sensed by a change in said light as detected by said photosensor.

2. The apparatus of claim 1 wherein said cavity length adjustor includes an electrode disposed to bias said first partially transmissive, partially reflective surface towards said second partially transmissive, partially reflective surface.

3. The apparatus of claim 1 wherein said cavity length adjustor includes an electrode disposed to bias said first partially transmissive, partially reflective surface away from said second partially transmissive, partially reflective surface.

4. The apparatus of claim 2 wherein said cavity length adjustor includes an electrode disposed to bias said first partially transmissive, partially reflective surface away from said second partially transmissive, partially reflective surface.

5. The apparatus of claim 2 wherein said bias is applied between said electrode and said first partially transmissive, partially reflective surface.

6. The apparatus of claim 2 wherein said bias is applied between said electrode and a flexible support of said first partially transmissive, partially reflective surface.

7. An apparatus comprising:
    an interferometer, including pair of partially transmissive, partially reflective, surfaces wherein a first of said surfaces is flexibly suspended adjacent and parallel to a second of said surfaces, said surfaces defining an interferometer cavity and an interferometer cavity length therebetween;
    a photosensor attached to said second surface outside of said cavity;
    a source of monochromatic light, said light for irradiating said photosensor through said first and second surfaces wherein said light is also partially reflected between said surfaces; and
    a cavity length adjustor independent of said photosensor for adjusting said cavity length,
    whereby a change in said cavity length is sensed by a change in said light as detected by said photosensor and wherein sensitivity of said apparatus is variable by adjusting said cavity length and is variable by activating and de-activating said light at a selected frequency.

8. The apparatus of claim 7 wherein said interferometer and said photosensor are monolithically integrated on a single substrate.

9. The apparatus of claim 7 wherein said cavity length adjustor includes an electrode disposed so that conduction therethrough biases said first partially transmissive, partially reflective surface towards said second partially transmissive, partially reflective surface.

10. The apparatus of claim 7 wherein said cavity length adjustor includes an electrode disposed so that conduction therethrough biases said first partially transmissive, partially reflective surface away from said second partially transmissive, partially reflective surface.

11. The apparatus of claim 9 wherein said cavity length adjustor includes an electrode disposed so that conduction therethrough biases said first partially transmissive, partially reflective surface away from said second partially transmissive, partially reflective surface.

12. The apparatus of claim 9 wherein said photosensor is a photodiode having a substrate and wherein said electrode shields said first partially transmissive, partially reflective surface from capacitive forces exerted by said substrate.

13. The apparatus of claim 9 wherein said bias is applied between said electrode and said first partially transmissive, partially reflective surface.

14. The apparatus of claim 7 wherein said bias is applied between said electrode and a flexible support of said first partially transmissive, partially reflective surface.

15. A high sensitivity micro-electromechanical optical accelerometer comprising:
    a Fabry-Perot interferometer, including pair of partially transmissive, partially reflective, surfaces wherein a first of said surfaces is flexibly suspended adjacent and parallel to a second of said surfaces, said surfaces defining an interferometer cavity and an interferometer cavity length therebetween;

a proof mass attached to said flexibly suspended first surface;

a photodiode attached to said second surface outside of said cavity;

a source of variable power, fixed wavelength, laser light, said light for irradiating said photodiode through said first and second surfaces wherein said light is also partially reflected between said surfaces; and an interferometer cavity length adjustor independent of said photodiode and disposed outside of a path defined by said light through said partially transmissive, partially reflective surfaces for adjusting said cavity length, whereby a change in said cavity length due to movement of one of said surfaces with respect to the other of said surfaces is sensed by a change in said light as detected by said photodiode and wherein said sensitivity of said accelerometer is variable by adjusting said cavity length, said power of said light and by activating and de-activating said light at a selected frequency.

16. The apparatus of claim 15 wherein said interferometer and said photodiode are monolithically integrated on a single substrate.

17. The apparatus of claim 15 wherein said interferometer cavity length adjustor includes an electrode disposed so that conduction therethrough biases said first partially transmissive, partially reflective surface towards said second partially transmissive, partially reflective surface.

18. The apparatus of claim 15 wherein said interferometer cavity length adjustor includes an electrode disposed so that conduction therethrough biases said first partially transmissive, partially reflective surface away from said second partially transmissive, partially reflective surface.

19. The apparatus of claim 17 wherein said interferometer cavity length adjustor includes an electrode disposed so that conduction therethrough biases said first partially transmissive, partially reflective surface away from said second partially transmissive, partially reflective surface.

20. The apparatus of claim 17 wherein said photosensor is a photodiode having a substrate and wherein said electrode shields said first partially transmissive, partially reflective surface from capacitive forces exerted by said substrate.

21. The apparatus of claim 17 wherein said bias is applied between said electrode and said first partially transmissive, partially reflective surface.

22. The apparatus of claim 17 wherein said bias is applied between said electrode and a flexible support of said first partially transmissive, partially reflective surface.

* * * * *